US012640434B2

(12) United States Patent
Hayashi et al.

(10) Patent No.: US 12,640,434 B2
(45) Date of Patent: May 26, 2026

(54) ADHESIVE FILM FOR METAL TERMINAL, METHOD FOR PRODUCING ADHESIVE FILM FOR METAL TERMINAL, METAL TERMINAL WITH ADHESIVE FILM FOR METAL TERMINAL ATTACHED THERETO, POWER STORAGE DEVICE, AND METHOD FOR PRODUCING POWER STORAGE DEVICE

(71) Applicant: DAI NIPPON PRINTING CO., LTD., Tokyo (JP)

(72) Inventors: Shinji Hayashi, Tokyo (JP); Yoichi Mochizuki, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 733 days.

(21) Appl. No.: 17/914,105

(22) PCT Filed: Apr. 1, 2021

(86) PCT No.: PCT/JP2021/014139
§ 371 (c)(1),
(2) Date: Sep. 23, 2022

(87) PCT Pub. No.: WO2021/201213
PCT Pub. Date: Oct. 7, 2021

(65) Prior Publication Data
US 2024/0145857 A1 May 2, 2024

(30) Foreign Application Priority Data

Apr. 2, 2020 (JP) ................................. 2020-066732
Mar. 3, 2021 (JP) ................................. 2021-033515

(51) Int. Cl.
| | |
|---|---|
| *H01M 50/375* | (2021.01) |
| *H01M 50/186* | (2021.01) |
| *H01M 50/193* | (2021.01) |
| *H01M 50/198* | (2021.01) |
| *H01M 50/342* | (2021.01) |
| *H01M 50/178* | (2021.01) |

(52) U.S. Cl.
CPC ....... *H01M 50/375* (2021.01); *H01M 50/186* (2021.01); *H01M 50/193* (2021.01);
(Continued)

(58) Field of Classification Search
CPC ............. H01M 50/375; H01M 50/198; H01M 50/193; H01M 50/342
See application file for complete search history.

(56) References Cited

U.S. PATENT DOCUMENTS

| | | | |
|---|---|---|---|
| 2015/0372263 A1 | 12/2015 | Douke et al. | |
| 2021/0091435 A1 | 3/2021 | Muraki | |
| 2021/0234222 A1* | 7/2021 | Hiraki | ................. H01M 50/186 |

FOREIGN PATENT DOCUMENTS

| | | |
|---|---|---|
| EP | 2955770 A1 | 12/2015 |
| JP | 2001-093489 A | 4/2001 |

(Continued)

OTHER PUBLICATIONS

"Polypropylene Melting Point & PP Softening Temperature Explained", Palmetto Industries, retrieved online on Oct. 15, 2025 from: https://www.palmetto-industries.com/polypropylene-melting-point/#:~:text=Polypropylene%20softening%20temperature,for%20specific%20heat%2Drelated%20requirements.*

(Continued)

*Primary Examiner* — Kenneth J Douyette
(74) *Attorney, Agent, or Firm* — Oliff PLC

(57) ABSTRACT

An adhesive film for a metal terminal, which is to be interposed between a metal terminal electrically connected to an electrode of a power storage device element and a power storage device packaging material for sealing the power storage device element, wherein the adhesive film for a metal terminal has a laminate sequentially including a first polyolefin layer disposed on the metal terminal side, a base material, and a second polyolefin layer disposed on the (Continued)

power storage device packaging material side, at least one of the first polyolefin layer and the second polyolefin layer has a melting peak temperature of 105° C. or more and 130° C. or less, and the base material has a surface hardness of 15 N/mm$^2$ or more, as measured in an environment at a temperature of 110° C.

10 Claims, 3 Drawing Sheets

(52) U.S. Cl.
CPC ....... *H01M 50/198* (2021.01); *H01M 50/342* (2021.01); *H01M 50/178* (2021.01); *H01M 2200/10* (2013.01)

(56) References Cited

FOREIGN PATENT DOCUMENTS

| JP | 2001-229904 A | 8/2001 | |
| JP | 2002-008616 A | 1/2002 | |
| JP | 2005-116474 A | 4/2005 | |
| JP | 2014-225378 A | 12/2014 | |
| JP | 2015-079638 A | 4/2015 | |
| KR | 2004-0110156 A | 12/2004 | |
| WO | WO-2019244971 A1 * | 12/2019 | ......... H01M 50/172 |
| WO | 2020/004412 A1 | 1/2020 | |

OTHER PUBLICATIONS

"CPP—Cast Polypropylene", WAPO Corporation, retrieved online on Oct. 14, 2025 from: https://www.wapo.com.tw/en/materials/cpp/.*

Jun. 22, 2021 International Search Report issued in International Patent Application No. PCT/JP2021/014139.

Jun. 14, 2022 Office Action issued in Japanese Patent Application No. 2022-512695.

Mar. 5, 2025 Extended European Search Report issued in European Patent Application No. 21780967.2.

Apr. 22, 2025 Office Action issued in Korean Application No. 10-2022-7024138.

* cited by examiner (a)                                              (b)

ADHESIVE FILM FOR METAL TERMINAL, METHOD FOR PRODUCING ADHESIVE FILM FOR METAL TERMINAL, METAL TERMINAL WITH ADHESIVE FILM FOR METAL TERMINAL ATTACHED THERETO, POWER STORAGE DEVICE, AND METHOD FOR PRODUCING POWER STORAGE DEVICE

TECHNICAL FIELD

The present disclosure relates to an adhesive film for a metal terminal, a method for producing the adhesive film for a metal terminal, a metal terminal with the adhesive film for a metal terminal attached thereto, a power storage device, and a method for producing the power storage device.

BACKGROUND ART

Various types of power storage devices have been heretofore developed, and in every power storage device, a power storage device packaging material is an essential member for sealing a power storage device element including electrodes and an electrolyte. Metallic power storage device packaging materials have been heretofore widely used as power storage device packaging materials. In recent years, however, along with improvements in the performance of electric cars, hybrid electric cars, personal computers, cameras, mobile phones, and the like, power storage devices have been required to be diversified in shape, and to be thinner and lighter weight. However, the widely used metallic power storage device packaging materials are disadvantageous in that they have difficulty in keeping up with the diversification of shapes, and are limited in weight reduction.

Thus, a laminated sheet in which a base material layer/an adhesive layer/a barrier layer/a heat-sealable resin layer are sequentially laminated has been recently proposed as a power storage device packaging material that can be readily processed into various shapes, and can achieve a thickness reduction and a weight reduction. When such a laminated film-shaped power storage device packaging material is used, a power storage device element is sealed with the power storage device packaging material by heat-sealing a peripheral region of the power storage device packaging material in a state wherein the heat-sealable resin layers, positioned as the innermost layers of the power storage device packaging material, are opposed to each other.

Metal terminals protrude from the heat-sealed region of the power storage device packaging material, and the power storage device element sealed with the power storage device packaging material is electrically connected to the outside via the metal terminals electrically connected to the electrodes of the power storage device element. That is, in the heat-sealed region of the power storage device packaging material, the region where each of the metal terminals is present is heat-sealed with the metal terminal being held between the heat-sealable resin layers. Because the metal terminal and the heat-sealable resin layer are formed of different types of materials, the adhesion is likely to decrease at the interface between the metal terminal and the heat-sealable resin layer.

Thus, an adhesive film may be disposed between the metal terminal and the heat-sealable resin layer, for the purpose of improving the adhesion between these layers, for example. An example of this adhesive film is disclosed in, for example, Patent Literature 1.

CITATION LIST

Patent Literature

Patent Literature 1: JP-A-2015-79638
Patent Literature 2: JP-A-2007-8616

SUMMARY OF INVENTION

Technical Problem

In recent years, as smartphones have enabled faster and larger volumes of data communication, the amount of electricity consumed has also increased, and thus, research to increase the capacity of power storage devices has been conducted. However, increasing the battery capacity increases the container size and the amount of reactive substances, and also increases the amount of gas generated in the event of thermal runaway of the power storage device (i.e., in the event of a temperature rise in the power storage device), leading to an increased risk of explosion due to an increase in internal pressure of the power storage device. Power storage devices (for example, metal can batteries) produced using metallic packaging materials may be provided with a safety valve to ensure safety in the event of gas generation (see Patent Literature 2).

However, it is difficult to provide this safety valve in power storage devices produced using laminated film-shaped packaging materials. Thus, there is an issue of avoiding expansion of such a power storage device due to gas generated inside the power storage device when heated to a high temperature.

Under such circumstances, it is a main object of the present disclosure to provide an adhesive film for a metal terminal, which is to be interposed between a metal terminal electrically connected to an electrode of a power storage device element and a power storage device packaging material for sealing the power storage device element, which adhesive film for a metal terminal allows the metal terminal of the power storage device and a heat-sealable resin layer of the power storage device packaging material to adhere to each other until the power storage device is heated to a high temperature (for example, 100 to 130° C., preferably 110 to 130° C., particularly, preferably 120 to 130° C.), and allows the power storage device to open at the position of the adhesive film for a metal terminal to release a gas generated inside the power storage device to the outside when the power storage device is heated to the high temperature (for example, 100 to 130° C., preferably 110 to 130° C., particularly preferably 120 to 130° C.). It is also an object of the present disclosure to provide a method for producing the adhesive film for a metal terminal, a metal terminal with the adhesive film for a metal terminal attached thereto, a power storage device, and a method for producing the power storage device.

Solution to Problem

The inventors of the present disclosure have conducted extensive research to solve the aforementioned problem. As a result, they have found that an adhesive film for a metal terminal, which is to be interposed between a metal terminal electrically connected to an electrode of a power storage device element and a power storage device packaging material for sealing the power storage device element, wherein the adhesive film for a metal terminal comprises a laminate sequentially including a first polyolefin layer disposed on the metal terminal side, a base material, and a second polyolefin layer disposed on the power storage device packaging material side, at least one of the first polyolefin layer and the second polyolefin layer has a melting peak temperature of 105° C. or more and 130° C. or less, and the base material has a surface hardness of 15 N/mm² or more, as measured in an environment at a temperature of 110° C., allows the metal terminal of the power storage device and a heat-sealable resin layer of the power storage device packaging material to adhere to each other until the power storage device is heated to a high temperature (for example, 100 to 130° C.), and allows the power storage device to open at the position of the adhesive film for a metal terminal (specifically, the position of the first polyolefin layer or the second poly olefin layer having a melting peak temperature of 105° C. or more and 130° C. or less, and more specifically, the first polyolefin layer region, the second polyolefin layer region, the interface region between the first polyolefin layer and the base material, or the interface region between the second polyolefin layer and the base material) to release a gas generated inside the power storage device to the outside when the power storage device is heated to the high temperature. The present disclosure has been completed as a result of further research based on this finding.

In summary, the present disclosure provides an embodiment of the invention as set forth below:

An adhesive film for a metal terminal, which is to be interposed between a metal terminal electrically connected to an electrode of a power storage device element and a power storage device packaging material for sealing the power storage device element, wherein the adhesive film for a metal terminal comprises a laminate sequentially including a first polyolefin layer disposed on the metal terminal side, a base material, and a second polyolefin layer disposed on the power storage device packaging material side, at least one of the first polyolefin layer and the second polyolefin layer has a melting peak temperature of 105° C. or more and 130° C. or less, and the base material has a surface hardness of 15 N/mm² or more, as measured in an environment at a temperature of 110° C.

Advantageous Effects of Invention

The present disclosure can provide an adhesive film for a metal terminal, which is to be interposed between a metal terminal electrically connected to an electrode of a power storage device element and a power storage device packaging material for sealing the power storage device element, which adhesive film for a metal terminal allows the metal terminal of the power storage device and a heat-sealable resin layer of the power storage device packaging material to adhere to each other until the power storage device is heated to a high temperature (for example, 100 to 130° C., preferably 110 to 130° C. particularly preferably 120 to 130° C.), and allows the power storage device to open at the position of the adhesive film for a metal terminal to release a gas generated inside the power storage device to the outside when the power storage device is heated to the high temperature. It is also an object of the present disclosure to provide a method for producing the adhesive film for a metal terminal, a metal terminal with the adhesive film for a metal terminal attached thereto, a power storage device, and a method for producing the power storage device.

DESCRIPTION OF EMBODIMENTS

Figure 1:
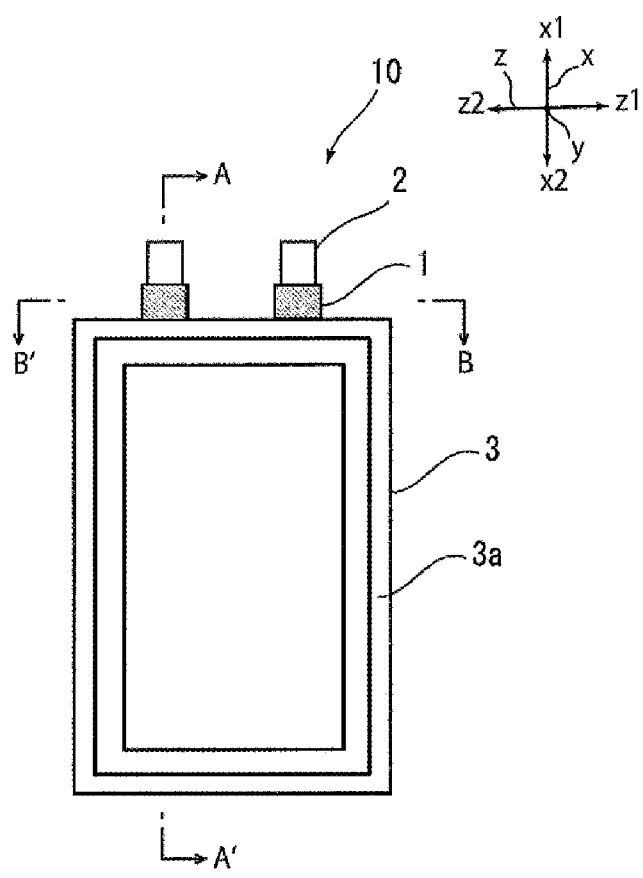
FIG. 1 is a schematic plan view of a power storage device according to the present disclosure.

An adhesive film for a metal terminal of the present disclosure is an adhesive film for a metal terminal, which is to be interposed between a metal terminal electrically connected to an electrode of a power storage device element and a power storage device packaging material for sealing the power storage device element, wherein the adhesive film for a metal terminal comprises a laminate sequentially including a first polyolefin layer disposed on the metal terminal side, a base material, and a second polyolefin layer disposed on the power storage device packaging material side, at least one of the first polyolefin layer and the second polyolefin layer has a melting peak temperature of 105° C. or more and 130° C. or less, and the base material has a surface hardness of 15 N/mm² or more, as measured in an environment at a temperature of 110° C.

Because of these features, the adhesive film for a metal terminal of the present disclosure allows the metal terminal of the power storage device and a heat-sealable resin layer of the power storage device packaging material to adhere to each other until the power storage device is heated to a high temperature (for example, 100 to 130° C., preferably 110 to 130° C., particularly preferably 120 to 130° C.), and allows the power storage device to open at the position of the adhesive film for a metal terminal to release a gas generated inside the power storage device to the outside when the power storage device is heated to the high temperature (for example, 100 to 130° C., preferably 110 to 130° C., particularly preferably 120 to 130° C.).

A power storage device of the present disclosure is a power storage device comprising a power storage device element comprising at least a positive electrode, a negative electrode, and an electrolyte, a power storage device packaging material for sealing the power storage device element, and a metal terminal electrically connected to each of the positive electrode and the negative electrode and protruding outside the power storage device packaging material, wherein the adhesive film for a metal terminal of the present disclosure is interposed between the metal terminal and the power storage device packaging material.

The present disclosure also provides a power storage device comprising a power storage device element comprising at least a positive electrode, a negative electrode, and an electrolyte, a power storage device packaging material for sealing the power storage device element, and a metal terminal electrically connected to each of the positive electrode and the negative electrode and protruding outside the power storage device packaging material, wherein an adhesive film for a metal terminal is interposed between the metal terminal and the power storage device packaging material, the adhesive film for a metal terminal comprises a laminate sequentially including a first polyolefin layer disposed on the metal terminal side, a base material, and a second polyolefin layer disposed on the power storage device packaging material side, and the power storage device opens from a position where the first polyolefin layer or the second polyolefin layer of the adhesive film for a metal terminal is laminated, in an environment at a temperature of 100° C. or more and 130° C. or less (that is, the power storage device opens from a position where the first polyolefin layer or the second polyolefin layer of the adhesive film for a metal terminal is laminated, in any of temperature environments in the range of temperatures of 100° C. or more and 130° C. or less).

The following describes in detail the adhesive film for a metal terminal of the present disclosure and a method for producing the adhesive film for a metal terminal, and a power storage device and a method for producing the power storage device.

In the present specification, any numerical range indicated by "to . . . " is intended to mean " . . . or more" and " . . . or less". For example, the recitation "2 to 15 mm" is intended to mean 2 mm or more and 15 mm or less.

1. Adhesive for Metal Terminal

Figure 2:
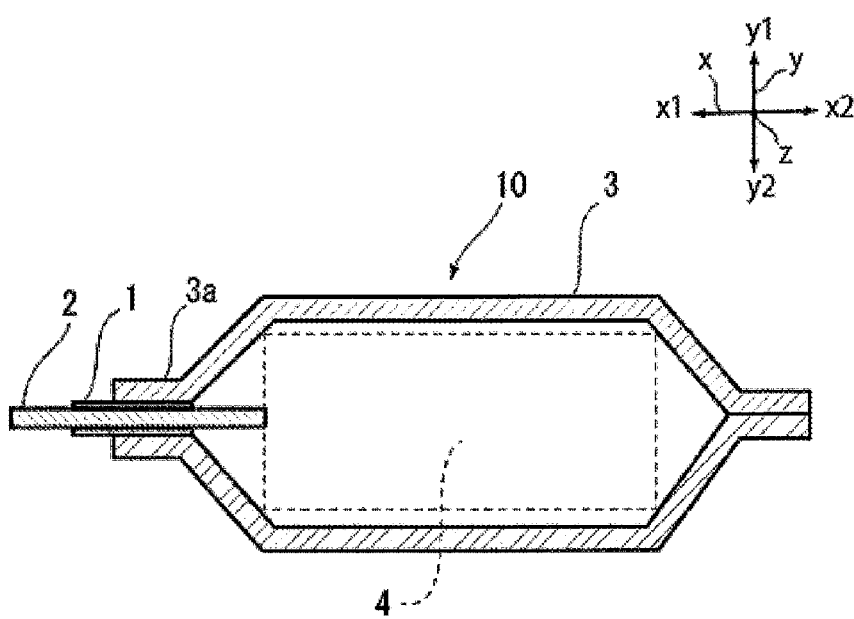
FIG. 2 is a schematic cross-sectional view taken along line A-A' in FIG. 1.
Figure 3:
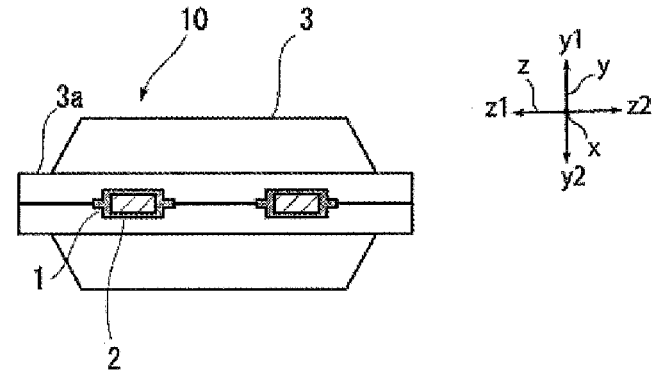
FIG. 3 is a schematic cross-sectional view taken along line B-B' in FIG. 1.

The adhesive film for a metal terminal of the present disclosure is interposed between a metal terminal electrically connected to an electrode of a power storage device element and a power storage device packaging material for sealing the power storage device element. Specifically, as shown in FIGS. 1 to 3, for example, an adhesive film 1 for a metal terminal according to the present disclosure is interposed between a metal terminal 2, which is electrically connected to an electrode of a power storage device element 4, and a power storage device packaging material 3 for sealing the power storage device element 4. The metal terminal 2 protrudes outside the power storage device packaging material 3, and is held between the power storage device packaging materials 3 with the adhesive film 1 for a metal terminal interposed therebetween, in a peripheral region 3a of the power storage device packaging materials 3 that have been heat-sealed.

In the present disclosure, a temporary bonding step of the adhesive film for a metal terminal to the metal terminal is performed, for example, about three to six times, at a temperature of about 140 to 160° C., and a pressure of about 0.01 to 1.0 MPa, for a time of about 3 to 15 seconds; and a permanent bonding step of the adhesive film for a metal terminal to the metal terminal is performed; for example, about one to three times, at a temperature of about 160 to 240° C., and a pressure of about 0.01 to 1.0 MPa, for a time of about 3 to 15 seconds. Heating for heat-sealing the power storage device packaging materials with the metal terminal with the adhesive film for a metal terminal attached thereto interposed therebetween is typically performed about once, at a temperature in the range of about 180 to 210° C., and a pressure of about 1.0 to 2.0 MPa, for a time of about 3 to 5 seconds.

The adhesive film 1 for a metal terminal of the present disclosure is provided to increase the adhesion between the metal terminal 2 and the power storage device packaging material 3. The hermeticity of the power storage device element 4 is improved by increasing the adhesion between the metal terminal 2 and the power storage device packaging material 3. As described above, during heat-sealing of the power storage device element 4, the power storage device element is sealed in such a manner that the metal terminal 2 electrically connected to an electrode of the power storage device element 4 protrudes outside the power storage device packaging material 3. At this time, because the metal terminal 2 formed of metal and a heat-sealable resin layer 35 (layer formed of a heat-sealable resin, such as a polyolefin) positioned as the innermost layer of the power storage device packaging material 3 are formed of different types of materials, the hermeticity of the power storage device element is likely to decrease at the interface between the metal terminal 2 and the heat-sealable resin layer 35, if the adhesive film is not used.

Figure 4:
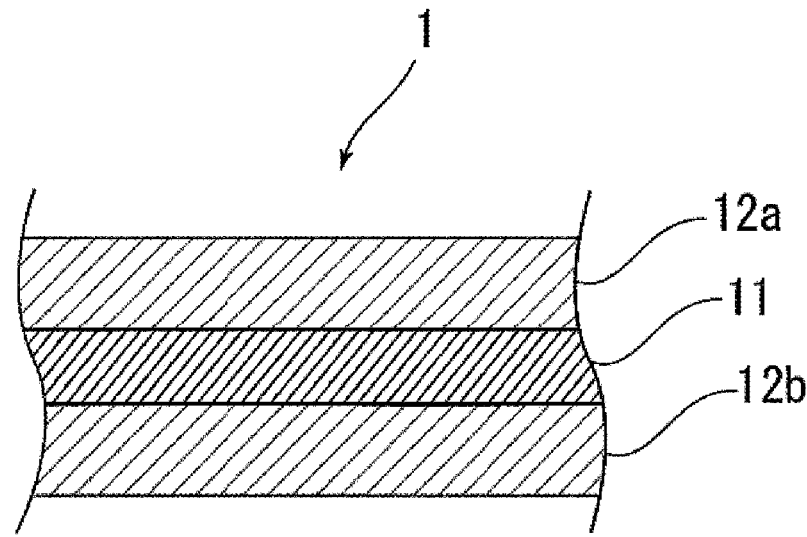
FIG. 4 is a schematic cross-sectional view of an adhesive film for a metal terminal according to the present disclosure.

As shown in FIG. 4, the adhesive film 1 for a metal terminal of the present disclosure includes a structure in which at least a first polyolefin layer 12a, a base material 11, and a second polyolefin layer 12b are sequentially laminated. The first polyolefin layer 12a is disposed on the metal terminal 2 side. The second polyolefin layer 12b is disposed on the power storage device packaging material 3 side. In the adhesive film 1 for a metal terminal of the present disclosure, the first polyolefin layer 12a and the second polyolefin layer 12b are positioned on both surfaces.

From the viewpoint of achieving the effects of the present invention more favorably, it is preferred that the first polyolefin layer 12a and the base material 11 be in surface contact with each other, and the second polyolefin layer 12b and the base material 11 be in surface contact with each other.

In the adhesive film 1 for a metal terminal of the present disclosure, each of the first polyolefin layer 12a and the second polyolefin layer 12b is a layer containing a polyolefin resin. Examples of polyolefin resins include polyolefins and acid-modified polyolefins. Of these polyolefin resins, the first polyolefin layer 12a preferably contains an acid-modified polyolefin, and is more preferably a layer formed of an acid-modified polyolefin. Of these polyolefin resins, the second polyolefin layer 12b preferably contains a polyolefin or an acid-modified polyolefin, more preferably contains a polyolefin, and is still more preferably a layer formed of a polyolefin.

The base material 11 preferably contains a polyolefin resin (i.e., has a polyolefin backbone), more preferably contains a polyolefin, and is still more preferably a layer formed of a polyolefin.

In each of the first polyolefin layer 12a, the second polyolefin layer 12b, and the base material 11, the polyolefin resin is preferably a polypropylene resin. The polyolefin is preferably polypropylene, and the acid-modified polyolefin is preferably acid-modified polypropylene. The polyolefin resin such as a polyolefin or an acid-modified polyolefin may contain known additives, the below-described fillers and pigments, and the like.

Specific examples of preferred laminated structures of the adhesive film 1 for a metal terminal of the present disclosure include a three-layer structure in which the first polyolefin layer formed of acid-modified polypropylene/the base material formed of polypropylene/the second polyolefin layer formed of acid-modified polypropylene are sequentially laminated; and a three-layer structure in which the first polyolefin layer formed of acid-modified polypropylene/the base material formed of polypropylene/the second polyolefin layer formed of polypropylene are sequentially laminated. Of these, the latter three-layer structure is particularly preferred in view of the adhesiveness between the second polyolefin layer 12b and the heat-sealable resin layer 35 of the power storage device packaging material 3.

Materials constituting the first polyolefin layer 12a, the second polyolefin layer 12b, and the base material 11 are described in detail later.

When the adhesive film 1 for a metal terminal of the present disclosure is disposed between the power storage device packaging material 3 and the metal terminal 2 of a power storage device 10, the surface of the metal terminal 2 formed of metal and the heat-sealable resin layer 35 (layer formed of a heat-sealable resin, such as a polyolefin) of the power storage device packaging material 3 are bonded to each other, with the adhesive film 1 for a metal terminal interposed therebetween. The first polyolefin layer 12a of the adhesive film 1 for a metal terminal is disposed on the metal terminal 2 side, and the second polyolefin layer 12b is disposed on the power storage device packaging material 3 side, such that the first polyolefin layer 12a adheres to the metal terminal 2, and the second polyolefin layer 12b adheres to the heat-sealable resin layer 35 of the power storage device packaging material 3.

In the adhesive film 1 for a metal terminal of the present disclosure, the base material 11 has a surface hardness of 15 N/mm$^2$ or more, as measured in an environment at a temperature of 110° C., and at least one of the first polyolefin layer 12a and the second polyolefin layer 12b has a melting peak temperature of 105° C. or more and 130° C. or less. In the adhesive film for a metal terminal of the present disclosure, from the viewpoint of allowing the metal terminal of the power storage device and the heat-sealable resin layer of the power storage device packaging material to adhere to each other, and allowing the power storage device to open at the position of the adhesive film for a metal terminal to release a gas generated inside the power storage device to the outside when the power storage device is heated to a high temperature (for example, 100 to 130° C., preferably 110 to 130° C., particularly preferably 120 to 130° C.), the melting peak temperature of at least one of the first polyolefin layer 12a and the second polyolefin layer 12b is 105° C. or more and 130° C. or less to allow the power storage device to open from that layer. As described below, if the surface hardness at 110° C. of the base material 11 is below 15 N/mm$^2$, even if the melting peak temperature of at least one of the first polyolefin layer 12a and the second polyolefin layer 12b is 105° C. or more and 130° C. or less, it is difficult for the power storage device to open at the position of the adhesive film for a metal terminal when the power storage device is heated to the high temperature. This is believed to be due to the following reason: If the surface hardness of the base material 11 in a 110° C. environment is low, not only the first polyolefin layer 12a and the second polyolefin layer 12b of the adhesive film for a metal terminal, but also the base material 11 and the heat-sealable resin layer 35 of the power storage device packaging material are melted, and the base material layer 11 is mixed into the first polyolefin layer 12a and the second polyolefin layer 12b, in the step of heat-sealing the power storage device packaging materials and the metal terminal with the adhesive film for a metal terminal attached thereto, in the peripheral region 3a. As a result, the heat resistance of the sealed region is increased, making it difficult for the power storage device to open. In the present disclosure, the method of measuring the surface hardness of the base material and the method of measuring the melting peak temperature are as given below.

<Measurement of Surface Hardness of Base Material>

The base material is bonded to one side of a glass slide with a double-faced adhesive tape to provide a measurement sample. Next, a hot stage is mounted on an ultra-microhardness tester (for example, HM2000 from Fischer Instruments), and the surface hardness of the base material-side surface of the measurement sample is measured in an environment at a temperature of 110° C. (heating temperature of the stage: 110° C.).

<Measurement of Melting Peak Temperature>

The melting peak temperature of each measurement sample is measured in accordance with HS K 7121: 2012 (Testing Methods for Transition Temperatures of Plastics) (Supplement 1 to HS K 7121: 1987)). The measurement is performed using a differential scanning calorimeter (DSC, for example, the differential scanning calorimeter Q200 from TA Instruments Inc.). The measurement sample is held at –50° C. for 15 minutes and then heated from –50° C. to 210° C. at a heating rate of 10° C./min to measure the first melting peak temperature P (° C.), and thereafter held at 210° C. for 10 minutes. Next, the measurement sample is cooled from 210° C. to –50° C. at a cooling rate of 10° C./min and held for 15 minutes. The measurement sample is further heated from –50° C. to 210° C. at a heating rate of 10° C./min to measure the second melting peak temperature Q (° C.). The flow rate of nitrogen gas is 50 ml/min. Using the above procedure, the first measured melting peak temperature P (° C.) and the second measured melting peak temperature Q (° C.) are obtained. Using the above procedure, the value of the first measured melting peak temperature P (° C.) is adopted as the melting peak temperature.

From the viewpoint of achieving the effects of the present disclosure more favorably, the surface hardness of the base material 11 in an environment at a temperature of 110° C. is preferably about 20 N/mm$^2$ or more, more preferably about 25 N/mm$^2$ or more, and still more preferably about 30 N/mm$^2$ or more. From the same viewpoint, the surface hardness is preferably about 60 N/mm$^2$ or less, more preferably about 50 N/mm$^2$ or less, and still more preferably about 45 N/mm$^2$ or less. Preferred ranges of the surface hardness include from about 15 to 60 N/mm$^2$, from about 15 to 50 N/mm$^2$ from about 15 to 45 N/mm$^2$, from about 20 to 60 N/mm$^2$, from about 20 to 50 N/mm$^2$, from about 20 to 45 N/mm$^2$, from about 25 to 60 N/mm$^2$, from about 25 to 50 N/mm$^2$, from about 25 to 45 N/mm$^2$, from about 30 to 60 N/mm$^2$ from about 30 to 50 N/mm$^2$, and from about 30 to 45 N/mm$^2$.

From the viewpoint of achieving the effects of the present disclosure more favorably, the melting peak temperature of the base material 11 is, for example, about 135° C. or more, preferably about 150° C. or more, more preferably about 155° C. or more, still more preferably about 160° C. or more, and even more preferably about 163° C. or more. From the same viewpoint, the melting peak temperature of the base material 11 is preferably about 180° C. or less, more preferably about 175° C. or less, and still more preferably about 170° C. or less. Preferred ranges of the melting peak temperature include from about 135 to 180° C., from about 135 to 175° C., from about 135 to 170° C., from about 150 to 180° C., from about 150 to 175° C., from about 150 to 170° C., from about 155 to 180° C., from about 155 to 175° C., from about 155 to 170° C., from about 160 to 180° C., from about 160 to 175° C., from about 160 to 170° C., from about 163 to 180° C., from about 163 to 175° C., and from about 163 to 170° C.

From the viewpoint of achieving the effects of the present disclosure more favorably, the melting peak temperature of the first polyolefin layer 12a disposed on the metal terminal 2 side is preferably about 110° C. or more, more preferably about 115° C. or more, and still more preferably about 120° C. or more. From the same viewpoint, the melting peak temperature is, for example, 150° C. or less, preferably 140° C. or less, more preferably 130° C. or less, still more preferably about 128° C. or less, and even more preferably about 125° C. or less. Preferred ranges of the melting peak temperature include from about 105 to 150° C., from about 105 to 140° C., from about 105 to 130° C., from about 105 to 128° C., from about 105 to 125° C., from about 110 to 150° C., from about 110 to 140° C., from about 110 to 130° C., from about 110 to 128° C., from about 110 to 125° C., from about 115 to 150° C., from about 115 to 140° C., from about 115 to 130° C., from about 115 to 128° C., from about 115 to 125° C., from about 120 to 150° C., from about 120 to 140° C., from about 120 to 130° C., from about 120 to 128° C., and from about 120 to 125° C. It should be noted, as described above, that at least one of the first polyolefin layer 12a and the second polyolefin layer 12b has a melting peak temperature of 105° C. or more and 130° C. or less.

From the same viewpoint, the melting peak temperature of the second polyolefin layer 12b disposed on the power storage device packaging material 3 side is preferably about 110° C. or more, more preferably about 115° C. or more, and still more preferably about 120° C. or more. From the same viewpoint, the melting peak temperature is, for example, 150° C. or less, preferably 140° C. or less, more preferably 130° C. or less, still more preferably about 128° C. or less, and even more preferably about 125° C. or less. Preferred ranges of the melting peak temperature include from about 105 to 150° C., from about 105 to 140° C., from about 105 to 130° C., from about 105 to 128° C., from about 105 to 125° C., from about 110 to 150° C., from about 110 to 140° C., from about 110 to 130° C., from about 110 to 128° C., from about 110 to 125° C., from about 115 to 150° C., from about 115 to 140° C., from about 115 to 130° C., from about 115 to 128° C., from about 115 to 125° C., from about 120 to 150° C., from about 120 to 140° C., from about 120 to 130° C., from about 120 to 128° C., and from about 120 to 125° C. It should be noted, as described above, that at least one of the first polyolefin layer 12a and the second polyolefin layer 12b has a melting peak temperature of 105° C. or more and 130° C. or less.

The melting peak temperature of the second poly olefin layer 12b is preferably 130° C. or more. As described below, when the melting peak temperature of the first polyolefin layer 12a disposed on the metal terminal 2 side is 105° C. or more and 130° C. or less, and the melting peak temperature of the second polyolefin layer 12b disposed on the power storage device packaging material 3 side and the melting peak temperature of the heat-sealable resin layer 35 of the power storage device packaging material 3 are both 130° C. or more, the metal terminal of the power storage device and the heat-sealable resin layer of the power storage device packaging material can adhere to each other until the power storage device is heated to a high temperature (for example, 100 to 130° C., preferably 110 to 130° C., particularly preferably 120 to 130° C.), and the power storage device can open at the position of the adhesive film for a metal terminal to release a gas generated inside the power storage device to the outside when the power storage device is heated to the high temperature (for example, 100 to 130° C., preferably 110 to 130° C., particularly preferably 120 to 130° C.) In this embodiment, the melting peak temperature of the second polyolefin layer 12b is preferably 130 to 150° C.

From the viewpoint of achieving the effects of the present disclosure more favorably, the entire thickness of the adhesive film 1 for a metal terminal is, for example, about 60 μm or more, preferably about 70 μm or more, and still more preferably about 80 μm or more. On the other hand, the entire thickness of the adhesive film 1 for a metal terminal of the present disclosure is preferably about 150 μm or less, more preferably about 120 μm or less, and still more preferably about 100 μm or less. Preferred ranges of the entire thickness of the adhesive film 1 for a metal terminal of the present disclosure include from about 60 to 150 μm, from about 60 to 130 μm, from about 60 to 100 μm, from about 70 to 150 μm, from about 70 to 130 μm, from about 70 to 100 μm, from about 80 to 150 μm, from about 80 to 130 μm, and from about 80 to 100 μm.

The materials, thicknesses, and the like of the first polyolefin layer 12a, second polyolefin layer 12b, and the base material 11 are hereinafter described in detail.

[First Polyolefin Layer 12a and Second Polyolefin Layer 12b]

As shown in FIG. 4, the adhesive film 1 for a metal terminal of the present disclosure includes the first polyolefin layer 12a on one surface of the base material 11 and the second polyolefin layer 12b on the other surface. The first polyolefin layer 12a is disposed on the metal terminal 2 side. The second polyolefin layer 12b is disposed on the power storage device packaging material 3 side. In the adhesive film 1 for a metal terminal of the present disclosure, the first polyolefin layer 12a and the second polyolefin layer 12b are positioned on both surfaces.

In the present disclosure, the melting peak temperature of at least one of the first polyolefin layer 12a and the second polyolefin layer 12b is 105° C. or more and 130° C. or less. In the adhesive film 1 for a metal terminal of the present disclosure, from the viewpoint of allowing the metal terminal 2 of the power storage device and the heat-sealable resin layer 35 of the power storage device packaging material 3 to adhere to each other, and allowing the power storage device to open at the position of the adhesive film for a metal terminal to release a gas generated inside the power storage device to the outside when the power storage device is heated to a high temperature (for example, 100 to 130° C., 110 to 130° C., or even 120 to 130° C.), the melting peak temperature of at least one of the first polyolefin layer 12a, and the second polyolefin layer 12b is 105° C. or more and 130° C. or less to allow the power storage device to open from the first polyolefin layer 12a or the second polyolefin layer 12b having a melting peak temperature of 105° C. or more and 130° C. or less. The melting temperature of the polyolefin can be adjusted by copolymerizing propylene and ethylene. Typically, the melting peak temperature can be reduced to about 130° C. by random copolymerization of propylene with 5% by mass or less of ethylene. Furthermore, polypropylene with a melting point of about 100° C. can be prepared using the method disclosed in JP-A-2016-524002.

In the adhesive film 1 for a metal terminal of the present disclosure, each of the first polyolefin layer 12a and the second polyolefin layer 12b is a layer containing a polyolefin resin. Examples of polyolefin resins include polyolefins and acid-modified polyolefins. Of these polyolefin resins, the first polyolefin layer 12a preferably contains an acid-modified polyolefin, and is more preferably a layer formed of an acid-modified polyolefin. Of these polyolefin resins, the second polyolefin layer 12b preferably contains a polyolefin or an acid-modified polyolefin, more preferably contains a polyolefin, and is still more preferably a layer formed of a polyolefin or an acid-modified polyolefin. The acid-modified polyolefin has high affinity for metals. Furthermore, each of the polyolefin and the acid-modified polyolefin has high affinity for heat-sealable resins, such as a polyolefin. In the adhesive film 1 for a metal terminal of the present disclosure, therefore, the first polyolefin layer 12a formed of the acid-modified polyolefin is disposed on the metal terminal 2 side, such that higher adhesion can be achieved at the interface between the adhesive film 1 for a metal terminal and the metal terminal 2. Furthermore, the second polyolefin layer 12b formed of the polyolefin or the acid-modified polyolefin is disposed on the heat-sealable resin layer 35 side of the power storage device packaging material 3, such that higher adhesion can be achieved at the interface between the adhesive film 1 for a metal terminal and the heat-sealable resin layer 35.

As described above, specific examples of preferred laminated structures of the adhesive film 1 for a metal terminal of the present disclosure include a three-layer structure in which the first polyolefin layer formed of acid-modified polypropylene/the base material formed of polypropylene/the second polyolefin layer formed of acid-modified polypropylene are sequentially laminated; and a three-layer structure in which the first polyolefin layer formed of acid-modified polypropylene/the base material formed of polypropylene/the second polyolefin layer formed of polypropylene are sequentially laminated. Of these, the latter three-layer structure is particularly preferred in view of the adhesiveness between the second polyolefin layer 12b and the heat-sealable resin layer 35 of the power storage device packaging material 3.

While the acid-modified polyolefin is not limited as long as it is a polyolefin modified with an acid, it is preferably a polyolefin grafted with an unsaturated carboxylic acid or an anhydride thereof.

Specific examples of the polyolefin to be modified with an acid include polyethylene, such as low-density polyethylene, medium-density polyethylene, high-density polyethylene, and linear low-density polyethylene; crystalline or amorphous polypropylene, such as homopolypropylene, block copolymers of polypropylene (for example, block copolymers of propylene and ethylene), and random copolymers of polypropylene (for example, random copolymers of propylene and ethylene); and terpolymers of ethylene-butene-propylene. Preferred among these polyolefins are polyethylene and polypropylene, with polypropylene being particularly preferred.

The polyolefin to be modified with an acid may also be a cyclic polyolefin. For example, a carboxylic acid-modified cyclic polyolefin is a polymer obtained by replacing a portion of the monomers that constitute the cyclic polyolefin with an α,β-unsaturated carboxylic acid or an anhydride thereof, and copolymerizing them, or by block-polymerizing, or graft-polymerizing an α,β-unsaturated carboxylic acid or an anhydride thereof onto the cyclic polyolefin.

The cyclic polyolefin to be modified with an acid is a copolymer of an olefin and a cyclic monomer. Examples of the olefin as a constituent monomer of the cyclic polyolefin include ethylene, propylene, 4-methyl-1-pentene, butadiene, and isoprene. Examples of the cyclic monomer as a constituent monomer of the cyclic polyolefin include cyclic alkenes, such as norbornene; specifically, cyclic dienes, such as cyclopentadiene, dicyclopentadiene, cyclohexadiene, and norbornadiene. Preferred among these polyolefins are cyclic alkenes, and more preferred is norbornene. Examples of constituent monomers also include styrene.

Examples of the carboxylic acid or anhydride thereof to be used for the acid modification include maleic acid, acrylic acid, itaconic acid, crotonic acid, maleic anhydride, and itaconic anhydride. Preferably, when the first polyolefin layer 12a is analyzed by infrared spectroscopy, peaks derived from maleic anhydride are detected. For example, when a maleic anhydride-modified polyolefin is measured by infrared spectroscopy, peaks derived from maleic anhydride are detected at a wavelength near $1760 \ cm^{-1}$ and a wavelength near $1780 \ cm^{-1}$. When the first polyolefin layer 12a or the second polyolefin layer 12b is a layer composed of a maleic anhydride-modified polyolefin, the peaks derived from maleic anhydride are detected, as measured by infrared spectroscopy. However, if the degree of acid modification is low, the peaks may be so small that they cannot be detected. In that case, the analysis can be performed by nuclear magnetic resonance spectroscopy.

Each of the first polyolefin layer 12a and the second polyolefin layer 12b may be formed using one resin component alone, or may be formed using a blend polymer obtained by combining two or more resin components. Furthermore, each of the first polyolefin layer 12a and the second polyolefin layer 12b may be formed of only one layer, or may be formed of two or more layers using the same resin component or different resin components. In view of the film formability of the first polyolefin layer 12a and the second polyolefin layer 12b, each of these layers is preferably formed using a blend polymer obtained by combining two or more resin components. When each of these layers is formed using a blend polymer, the blend polymer of the first polyolefin layer 12a preferably contains acid-modified polypropylene as a main component (component content: 50% by mass or more) and 50% by mass or less of another resin (preferably polyethylene, from the viewpoint of improving the flexibility); and the blend polymer of the second polyolefin layer 12b preferably contains polypropylene as a main component (component content: 50% by mass or more) and 50% by mass or less of another resin (preferably polyethylene, from the viewpoint of improving the flexibility). On the other hand, in view of the electrolytic solution resistance of the first polyolefin layer 12a and the second polyolefin layer 12b, the first polyolefin layer 12a preferably contains acid-modified polypropylene alone as the resin, and the second polyolefin layer 12b preferably contains acid-modified polypropylene or polypropylene alone as the resin.

Each of the first polyolefin layer 12a and the second polyolefin layer 12b may further optionally contain a filler. When the first polyolefin layer 12a and the second polyolefin layer 12b contain a filler, the filler functions as a spacer, which can effectively inhibit a short circuit between the metal terminal 2 and a barrier layer 33 of the power storage device packaging material 3. The filler has a particle diameter of about 0.1 to 35 μm, preferably about 5.0 to 30 μm, more preferably about 10 to 25 μm. The amount of the filler contained per 100 parts by mass of the resin component that forms each of the first polyolefin layer 12a and the second polyolefin layer 12b is about 5 to 30 parts by mass, and preferably about 10 to 20 parts by mass.

The filler may be either inorganic or organic. Examples of inorganic fillers include carbon (carbon and graphite), silica, aluminum oxide, barium titanate, iron oxide, silicon carbide, zirconium oxide, zirconium silicate, magnesium oxide, titanium oxide, calcium aluminate, calcium hydroxide, aluminum hydroxide, magnesium hydroxide, and calcium carbonate. Examples of organic fillers include fluororesins, phenol resins, urea resins, epoxy resins, acrylic resins, benzoguanamine-formaldehyde condensate, melamine-formaldehyde condensate, crosslinked polymethyl methacrylate, and crosslinked polyethylene. From the viewpoint of shape stability, rigidity, and contents resistance, aluminum oxide, silica, fluororesins, acrylic resins, and benzoguanamine-formaldehyde condensate are preferred; in particular, spherical aluminum oxide and silica are more preferred. As a method of mixing the filler into the resin component that forms each of the first polyolefin layer 12a and the second polyolefin layer 12b, the following methods may be adopted, for example: a method in which both components are melt-blended beforehand in a Banbury mixer or the like to form a masterbatch, which is then adjusted to a predetermined mixture ratio; and a method in which the filler is directly mixed into the resin component.

Each of the first polyolefin layer 12a and the second polyolefin layer 12b may also optionally contain a pigment. Various inorganic pigments may be used as the pigment. Specific examples of preferred pigments include carbon (carbon and graphite) mentioned above as the filler. Carbon (carbon and graphite), which is a material generally used inside a power storage device, does not have the possibility of dissolving into an electrolytic solution. Moreover, carbon (carbon and graphite) has a high coloring effect and thus can achieve a sufficient coloring effect when added only in an amount that does not impair adhesiveness, and also does not melt by heat and thus, can increase the apparent melt viscosity of the added resin. Furthermore, carbon (carbon and graphite) can prevent, during thermal bonding (heat sealing), thinning of the region to which pressure is applied, thereby imparting high hermeticity between the power storage device packaging material and the metal terminal.

When a pigment is to be added to the first polyolefin layer 12a and the second polyolefin layer 12b, in the case of using, for example, carbon black having a particle diameter of about 0.03 μm, the amount of the pigment to be added is about 0.05 to 0.3 part by mass, and preferably about 0.1 to 0.2 part by mass, per 100 parts by mass of the resin component that forms each of the first polyolefin layer 12a and the second polyolefin layer 12b. By adding a pigment to the first polyolefin layer 12a and the second polyolefin layer 12b, the presence or absence of the adhesive film 1 for a metal terminal can be detected with a sensor, or can be visually inspected. When a filler and a pigment are to be added to the first polyolefin layer 12a and the second polyolefin layer 12b, the filler and the pigment may be added to the identical first polyolefin layer 12a and second polyolefin layer 12b; however, from the viewpoint of avoiding impairment of the heat sealability of the adhesive film 1 for a metal terminal, it is preferred to add the filler and the pigment to each of the first polyolefin layer 12a and the second polyolefin layer 12b separately.

From the viewpoint of achieving the effects of the present disclosure more favorably, the thickness of each of the first polyolefin layer 12a and the second polyolefin layer 12b is preferably about 10 μm or more, more preferably about 15 μm or more, and still more preferably about 20 μm or more, while it is preferably about 60 μm or less, more preferably about 55 μm or less, still more preferably about 50 μm or less, and even more preferably about 40 μm or less. Preferred ranges of the thickness of each of the first polyolefin layer 12a and the second polyolefin layer 12b include from about 10 to 60 μm, from about 10 to 55 μm, from about 10 to 50 μm, from about 10 to 40 μm, from about 15 to 60 μm, from about 15 to 55 μm, from about 15 to 50 μm, from about 15 to 40 μm, from about 20 to 60 μm, from about 20 to 55 μm, from about 20 to 50 μm, and from about 20 to 40 μm.

From the same viewpoint, the ratio of the thickness of the base material 11 to the total thickness of the first polyolefin layer 12a and the second polyolefin layer 12b is preferably about 0.3 or more, and more preferably about 0.4 or more, while it is preferably about 1.0 or less, and more preferably about 0.8 or less. Preferred ranges include from about 0.3 to 1.0, from about 0.3 to 0.8 from about 0.4 to 1.0, and from about 0.4 to 0.8.

When the entire thickness of the adhesive film 1 for a metal terminal is taken as 100%, the ratio of the total thickness of the first polyolefin layer 12a and the second polyolefin layer 12b is preferably about 30 to 80%, and more preferably about 50 to 70%.

[Base Material 11]

In the adhesive film 1 for a metal terminal, the base material 11 is a layer that functions as a support of the adhesive film 1 for a metal terminal.

The base material 11 has the surface hardness as defined above.

The material that forms the base material 11 is not limited. Examples of the material that forms the base material 11 include polyolefin resins, polyamide resins, polyester resins, epoxy resins, acrylic resins, fluororesins, silicone resins, phenol resins, polyetherimides, polyimides, polycarbonates, and mixtures or copolymers thereof with polyolefin resins being particularly preferred among these. That is, the material that forms the base material 11 is preferably a resin containing a polyolefin backbone, such as a polyolefin or an acid-modified polyolefin. The inclusion of a polyolefin backbone in the resin that forms the base material 11 can be analyzed by, for example, infrared spectroscopy or gas chromatography-mass spectrometry.

As described above, the base material 11 preferably contains a polyolefin resin, more preferably contains a polyolefin, and is still more preferably a layer formed of a polyolefin. The layer formed of a polyolefin may be a stretched polyolefin film or an unstretched polyolefin film, preferably an unstretched polyolefin film. Specific examples of polyolefins include polyethylene, such as low-density polyethylene, medium-density polyethylene, high-density polyethylene, and linear low-density polyethylene; crystalline or amorphous polypropylene, such as homopolypropylene, block copolymers of polypropylene (for example, block copolymers of propylene and ethylene), and random copolymers of polypropylene (for example, random copolymers of propylene and ethylene); and terpolymers of ethylene-butene-propylene. Preferred among these polyolefins are polyethylene and polypropylene, with polypropylene being more preferred. Because of its excellent electrolytic solution resistance, the base material 11 preferably contains homopolypropylene, is more preferably formed of homopolypropylene, and is still more preferably an unstretched homopolypropylene film.

Specific examples of polyamides include aliphatic polyamides, such as nylon 6, nylon 66, nylon 610, nylon 12, nylon 46, and copolymers of nylon 6 and nylon 66; polyamides containing aromatics, such as hexamethylenediamine-isophthalic acid-terephthalic acid copolyamides containing structural units derived from terephthalic acid and/or isophthalic acid, for example, nylon 6I, nylon 6T, nylon 6IT, and nylon 6I6T (I denotes isophthalic acid, and T denotes terephthalic acid), and polymethaxylylene adipamide (MXD6), cycloaliphatic polyamides, such as polyaminomethyl cyclohexyl adipamide (PACM6); polyamides copolymerized with a lactam component or an isocyanate component such as 4,4'-diphenylmethane-diisocyanate, and polyester amide copolymers or polyether ester amide copolymers that are copolymers of copolyamides with polyesters or polyalkylene ether glycols; and copolymers thereof. These polyamides may be used alone or in combination.

Specific examples of polyesters include polyethylene terephthalate, polybutylene terephthalate, polyethylene naphthalate, polybutylene naphthalate, polyethylene isoph-thalate, copolyesters containing ethylene terephthalate as a main repeating unit, and copolyesters containing butylene terephthalate as a main repeating unit. Specific examples of copolyesters containing ethylene terephthalate as a main repeating unit include copolyesters obtained by polymeriz-ing ethylene terephthalate as a main repeating unit with ethylene isophthalate (abbreviated as polyethylene (tereph-thalate/isophthalate); hereinafter abbreviations are made in the same manner), polyethylene (terephthalate/isophtha-late), polyethylene (terephthalate/adipate), polyethylene (te-rephthalate/sodium sulfoisophthalate), polyethylene (tere-phthalate/sodium isophthalate), polyethylene (terephthalate/phenyl-dicarboxylate), and polyethylene (terephthalate/decane dicarboxylate). Specific examples of copolyesters containing butylene terephthalate as a main repeating unit include copolyesters obtained by polymerizing butylene terephthalate as a main repeating unit with butylene isoph-thalate (abbreviated as polybutylene (terephthalate/isoph-thalate); hereinafter abbreviations are made in the same manner), polybutylene (terephthalate/adipate), polybutylene (terephthalate/sebacate), polybutylene (terephthalate/decane dicarboxylate), and polybutylene naphthalate. These poly-esters may be used alone or in combination.

Alternatively, the base material 11 may be formed of a nonwoven fabric formed of the above-described resin. When the base material 11 is a nonwoven fabric, the base material 11 is preferably formed of a polyolefin resin, a polyamide resin, or the like as described above.

The base material 11 may be composed of a single layer or a plurality of layers. When the base material 11 is composed of a plurality of layers, at least one of the layers may contain a layer having a melting peak temperature of 135° C. or more as described above. A specific example of the plurality of layers is a three-layer structure in which block polypropylene/homopolypropylene/block polypropyl-ene are sequentially laminated.

The base material 11 may be blended with a colorant to form a layer containing the colorant. Alternatively, a resin with low transparency may be selected to adjust the light transmittance. When the base material 11 is a film, the film may be a colored film or a film with low transparency. When the base material 11 is a nonwoven fabric, the nonwoven fabric may be a nonwoven fabric formed using a binder or fibers containing a colorant, or may be a nonwoven fabric with low transparency.

When the base material 11 is formed of a resin film, the surface of the base material 11 may be optionally subjected to a known easy-adhesion means, such as corona discharge treatment, ozone treatment, or plasma treatment.

From the viewpoint of achieving the effects of the present disclosure more favorably, the thickness of the base material 11 is preferably 120 μm or less, more preferably 110 μm or less, still more preferably about 100 μm or less, and even more preferably about 90 μm or less. On the other hand, the thickness of the base material 11 is preferably about 20 μm or more, more preferably about 30 μm or more, and still more preferably about 40 μm or more. Preferred ranges of the thickness of the base material 11 include from about 20 to 120 μm, from about 20 to 110 μm, from about 20 to 100 μm, from about 20 to 90 μm, from about 30 to 120 μm, from about 30 to 110 μm, from about 30 to 100 μm, from about 30 to 90 μm, from about 40 to 120 μm, from about 40 to 110 μm, from about 40 to 100 μm, and from about 40 to 90 μm.

The adhesive film 1 for a metal terminal of the present disclosure may be produced by laminating the first poly-olefin layer 12a and the second polyolefin layer 12b onto both surfaces of the base material 11. Lamination between the base material 11, and the first polyolefin layer 12a and the second polyolefin layer 12b may be accomplished using a known method such as an extrusion lamination method, a T-die method, an inflation method, or a thermal lamination method.

The method of interposing the adhesive film 1 for a metal terminal between the metal terminal 2 and the power storage device packaging material 3 is not limited; for example, as shown in FIGS. 1 to 3, the adhesive film 1 for a metal terminal may be wound around the metal terminal 2 in the region where the metal terminal 2 is held between the power storage device packaging materials 3. Alternatively, although this is not illustrated, the adhesive film 1 for a metal terminal may be disposed on both surfaces of each of the metal terminals 2 as to as cross the two metal terminals 2, in the region where each metal terminal 2 is held between the power storage device packaging materials 3.

[Metal Terminal 2]

The adhesive film 1 for a metal terminal of the present disclosure is used by being interposed between the metal terminal 2 and the power storage device packaging material 3. The metal terminal 2 (tab) is a conductive member electrically connected to an electrode (the positive electrode or the negative electrode) of the power storage device element 4, and is formed of a metal material. Examples of the metal material constituting the metal terminal 2 include, but are not limited to, aluminum, nickel, and copper. For example, the metal terminal 2 connected to the positive electrode of a lithium ion power storage device is typically formed of aluminum or the like. The metal terminal 2 connected to the negative electrode of a lithium ion power storage device is typically formed of copper, nickel, or the like.

Preferably, the surface of the metal terminal 2 is subjected to a chemical conversion treatment, from the viewpoint of improving the electrolytic solution resistance. For example, when the metal terminal 2 is formed of aluminum, specific examples of the chemical conversion treatment include a known method in which a corrosion-resistant film composed of a phosphate, a chromate, a fluoride, a triazine-thiol compound, or the like is formed. Preferred among methods of forming a corrosion-resistant film is a phosphoric acid chromate treatment that uses a material composed of three components, i.e., a phenol resin, a chromium(III) fluoride compound, and phosphoric acid.

The dimensions of the metal terminal 2 may be adjusted appropriately according to the dimensions of the power storage device to be used, for example. The thickness of the metal terminal 2 is preferably about 50 to 1,000 μm, and more preferably about 70 to 800 μm. The length of the metal terminal 2 is preferably about 1 to 200 mm, and more preferably about 3 to 150 mm. The width of the metal terminal 2 is preferably about 1 to 200 mm, and more preferably about 3 to 150 mm.

[Power Storage Device Packaging Material 3]

Figure 6:
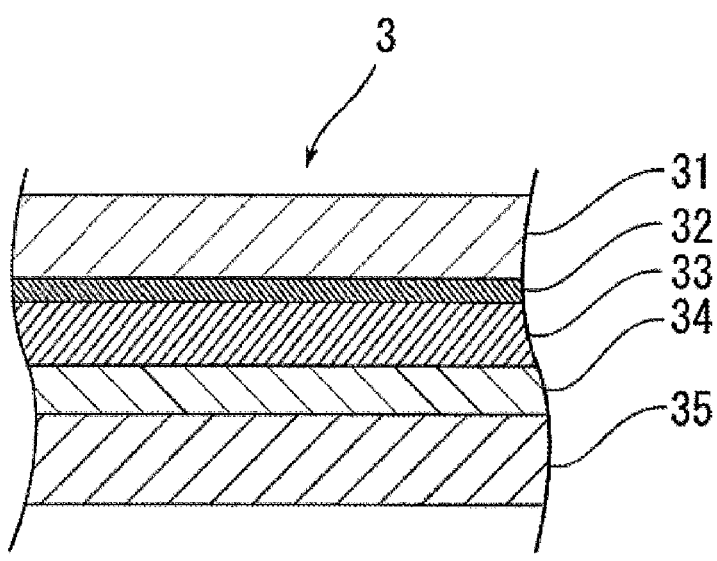
FIG. 6 is a schematic cross-sectional view of a power storage device packaging material according to the present disclosure.

The power storage device packaging material 3 is, for example, a power storage device packaging material having a laminated structure formed of a laminate sequentially having at least a base material layer 31, the barrier layer 33, and the heat-sealable resin layer 35. FIG. 6 shows one embodiment of the cross-sectional structure of the power storage device packaging material 3, in which the base material layer 31, an optional adhesive agent layer 32, the barrier layer 33, an optional adhesive layer 34, and the heat-sealable resin layer 35 are sequentially laminated. In the power storage device packaging material 3, the base material layer 31 is the outermost layer, and the heat-sealable resin layer 35 is the innermost layer. During the assembly of a power storage device, the heat-sealable resin layers 35 positioned on the periphery of the power storage device element 4 are brought into surface contact and heat-sealed with each other to hermetically seal the power storage device element 4, such that the power storage device element 4 is sealed. While FIGS. 1 to 3 illustrate the power storage device 10 that uses the embossed-type power storage device packaging material 3 molded by embossing molding, for example, the power storage device packaging material 3 may also be of a pouched type that is not molded. The pouched type includes a three-side seal type, a four-side seal type, and a pillow type, and any of these types may be used.

While the thickness of the laminate constituting the power storage device packaging material 3 is not limited, the upper limit is preferably about 180 μm or less, about 160 or less, about 155 μm or less, about 140 μm or less, about 130 μm or less, or about 120 μm or less, from the viewpoint of reducing costs, improving the energy density, and the like. On the other hand, the lower limit is preferably about 35 μm or more, about 45 μm or more, about 60 μm or more, or about 80 μm or more, from the viewpoint of maintaining the function of the power storage device packaging material 3 to protect the power storage device element 4. Preferred ranges include from about 35 to 180 μm, from about 35 to 160 μm, from about 35 to 155 μm, from about 35 to 140 μm, from about 35 to 130 μm, from about 35 to 120 μm, from about 45 to 180 μm, from about 45 to 160 μm, from about 45 to 155 μm, from about 45 to 140 μm, from about 45 to 130 μm, from about 45 to 120 μm, from about 60 to 180 μm, from about 60 to 160 μm, from about 60 to 155 μm, from about 60 to 140 μm, from about 60 to 130 μm, from about 60 to 120 μm, from about 80 to 180 μm, from about 80 to 160 μm, from about 80 to 155 μm, from about 80 to 140 from about 80 to 130 μm, and from about 80 to 120 μm.

(Base Material Layer 31)

In the power storage device packaging material 3, the base material layer 31 is a layer that functions as the base material of the power storage device packaging material, and forms the outermost layer side.

The material that forms the base material layer 31 is not limited as long as it has insulation properties. Examples of the material that forms the base material layer 31 include polyesters, polyamides, epoxy, acrylic resins, fluororesins, polyurethanes, silicone resins, phenol, polyetherimides, polyimides, and mixtures or copolymers thereof. A polyester, such as polyethylene terephthalate or polybutylene terephthalate, which has the advantage of having excellent electrolytic solution resistance, and being unlikely to cause whitening or the like due to attachment of the electrolytic solution, is suitably used as the material that forms the base material layer 31. Moreover, a polyamide film, which has excellent stretchability, and can prevent whitening due to cracking of the resin in the base material layer 31 during molding, is suitably used as the material that forms the base material layer 31.

The base material layer 31 may be formed of a uniaxially or biaxially stretched resin film, or may be formed of an unstretched resin film. Among the above, a uniaxially or biaxially stretched resin film, particularly a biaxially stretched resin film, which has improved heat resistance through oriented crystallization, is suitably used as the base material layer 31.

Preferred among the above as the resin film that forms the base material layer 31 are nylons and polyesters, and more preferred are biaxially stretched nylons and biaxially stretched polyesters.

The base material layer 31 can also be laminated with a resin film made of a different material, in order to improve the pinhole resistance, and the insulation properties when used as a packaging material for a power storage device. Specific examples include a multilayer structure in which a polyester film and a nylon film are laminated, and a multilayer structure in which a biaxially stretched polyester and a biaxially stretched nylon are laminated. When the base material layer 31 has a multilayer structure, the resin films may be bonded with an adhesive, or may be directly laminated without an adhesive. Examples of methods of bonding the resin films without an adhesive include methods in which the resin films are bonded in a heat-melted state, such as a co-extrusion method, a sandwich lamination method, and a thermal lamination method.

The base material layer 31 may be subjected to a friction-reducing treatment beforehand to improve moldability. When the base material layer 31 is subjected to a friction-reducing treatment, the coefficient of friction of the surface of the base material layer 31 is 1.0 or less, for example, although not limited thereto. Examples of the friction-reducing treatment of the base material layer 31 include matting treatment, formation of a thin film layer of a slipping agent, and a combination thereof.

The thickness of the base material layer 31 is, for example, about 10 to 50 μm, and preferably about 15 to 30 μm.

(Adhesive Agent Layer 32)

In the power storage device packaging material 3, the adhesive agent layer 32 is a layer that is optionally disposed on the base material layer 31 to impart adhesion to the base material layer 31. That is, the adhesive agent layer 32 is provided between the base material layer 31 and the barrier layer 33.

The adhesive agent layer 32 is formed of an adhesive capable of bonding the base material layer 31 and the barrier layer 33. The adhesive to be used for forming the adhesive agent layer 32 may be a two-liquid curable adhesive or a one-liquid curable adhesive. The adhesion mechanism of the adhesive used for forming the adhesive agent layer 32 is not limited, and may be any of a chemical reaction type, a solvent volatilization type, a heat melting type, a heat pressing type, and the like.

Preferred examples of the resin component of the adhesive that can be used to form the adhesive agent layer 32 include a polyurethane-based two-liquid curable adhesive; and a polyamide, a polyester, or a blend resin of any of these resins and a modified polyolefin, from the viewpoint of having excellent extensibility, excellent durability and yellowing-inhibiting action under high-humidity conditions, excellent thermal degradation-inhibiting action during heat-sealing, and the like, and effectively inhibiting delamination by preventing a decrease in the lamination strength between the base material layer 31 and the barrier layer 33.

The adhesive agent layer 32 may be multilayered with different adhesive components. When the adhesive agent layer 32 is to be multilayered with different adhesive components, from the viewpoint of improving the lamination strength between the base material layer 31 and the barrier layer 33, it is preferred to select a resin having excellent adhesion to the base material layer 31 as the adhesive component to be disposed on the base material layer 31 side, and select an adhesive component having excellent adhesion to the barrier layer 33 as the adhesive component to be disposed on the barrier layer 33 side. When the adhesive agent layer 32 is to be multilayered with different adhesive components, specific examples of preferred adhesive components to be disposed on the barrier layer 33 side include acid-modified polyolefins, metal-modified polyolefins, mixed resins of polyesters and acid-modified polyolefins, and resins containing copolyesters.

The thickness of the adhesive agent layer 32 is, for example, about 2 to 50 μm, and preferably about 3 to 25 μm. (Barrier Layer 33)

In the power storage device packaging material 3; the barrier layer 33 is a layer that functions to improve the strength of the power storage device packaging material, and prevent the ingress of water vapor, oxygen, light, and the like into the power storage device. The barrier layer 33 is preferably a metal layer, that is, a layer formed of a metal. Specific examples of the metal constituting the barrier layer 33 include aluminum, stainless steel, and titanium, with aluminum being preferred. The barrier layer 33 may be formed of, for example, a metal foil or a vapor-deposited metal film, a vapor-deposited inorganic oxide film, a vapor-deposited carbon-containing inorganic oxide film, or a film provided with any of these vapor-deposited films. The barrier layer 33 is preferably formed of a metal foil, and more preferably formed of an aluminum foil. From the viewpoint of preventing the occurrence of creases and pinholes in the barrier layer 33 during the production of the power storage device packaging material, the barrier layer is still more preferably formed of a soft aluminum foil, for example, annealed aluminum (JIS H4160: 1994 A8021H-O, JIS H4160: 1994 A8079H-O, JIS H4000: 2014 A8021P-O, and JIS H4000: 2014A8079 P-O).

The thickness of the barrier layer 33 is preferably about 10 to 200 μm, and more preferably about 20 to 100 μm, from the viewpoint of making the occurrence of pinholes less likely during molding, while reducing the thickness of the power storage device packaging material.

Preferably, at least one surface, preferably both surfaces, of the barrier layer 33 is/are subjected to a chemical conversion treatment, in order to stabilize the adhesiveness, and prevent dissolution or corrosion, for example. As used herein, the chemical conversion treatment refers to a treatment for forming a corrosion-resistant film on a surface of the barrier layer.

[Adhesive Layer 34]

In the power storage device packaging material 3, the adhesive layer 34 is a layer that is optionally provided between the barrier layer 33 and the heat-sealable resin layer 35, in order to strongly bond the heat-sealable resin layer 35.

The adhesive layer 34 is formed of an adhesive capable of bonding the barrier layer 33 and the heat-sealable resin layer 35. While the composition of the adhesive used for forming the adhesive layer is not limited, it is, for example, a resin composition containing an acid-modified polyolefin. Examples of the acid-modified polyolefin include the same acid-modified polyolefins as those mentioned as the first polyolefin layer 12a and the second polyolefin layer 12b.

The thickness of the adhesive layer 34 is, for example, about 1 to 40 μm, and preferably about 2 to 30 μm.

[Heat-Sealable Resin Layer 35]

In the power storage device packaging material 3, the heat-sealable resin layer 35 is a layer that corresponds to the innermost layer, and is heat-sealed with another heat-sealable resin layer during the assembly of a power storage device to hermetically seal the power storage device element.

While the resin component to be used as the heat-sealable resin layer 35 is not limited as long as it can be heat-sealed, examples include a polyolefin and a cyclic polyolefin.

Specific examples of the polyolefin include polyethylene, such as low-density polyethylene, medium-density polyethylene, high-density polyethylene, and linear low-density polyethylene; crystalline or amorphous polypropylene, such as homopolypropylene, block copolymers of polypropylene (for example, block copolymers of propylene and ethylene), and random copolymers of polypropylene (for example, random copolymers of propylene and ethylene); and terpolymers of ethylene-butene-propylene. Preferred among these polyolefins are polyethylene and polypropylene.

The cyclic polyolefin is a copolymer of an olefin and a cyclic monomer. Examples of the olefin as a constituent monomer of the cyclic polyolefin include ethylene, propylene, 4-methyl-1-pentene, butadiene, and isoprene. Examples of the cyclic monomer as a constituent monomer of the cyclic polyolefin include cyclic alkenes; such as norbornene specifically, cyclic dienes, such as cyclopentadiene, dicyclopentadiene, cyclohexadiene, and norbornadiene. Preferred among these polyolefins are cyclic alkenes, and more preferred is norbornene. Examples of constituent monomers also include styrene.

Preferred among these resin components are a crystalline or amorphous polyolefin, a cyclic polyolefin, and a blend polymer thereof; and more preferred are polyethylene, polypropylene, a copolymer of ethylene and norbornene, and a blend polymer of two or more of the above.

The heat-sealable resin layer 35 may be formed using one resin component alone, or may be formed using a blend polymer obtained by combining two or more resin components. Furthermore, the heat-sealable resin layer 35 may be formed of only one layer, or may be formed of two or more layers using the same resin component or different resin components. It is particularly preferred that the second polyolefin layer 12b and the heat-sealable resin layer 35 be formed of the same resin, which improves the adhesion between these layers.

The melting peak temperature of the heat-sealable resin layer 35 is, for example, about 120° C. or more, preferably about 125° C. or more, still more preferably about 130° C. or more, even more preferably 130° C. or more, and still more preferably 135° C. or more, while it is preferably about 160° C. or less, and more preferably 155° C. or less. Preferred ranges of the melting peak temperature of the heat-sealable resin layer 35 include from about 120 to 160° C., from about 120 to 155° C., from about 125 to 160° C., from about 125 to 155° C., from about 130 to 160° C., from about 130 to 155° C., from about 135 to 160° C. from about 135 to 155° C., from about 140 to 160° C., and from about 140 to 155° C. As described above, when the melting peak temperature of the first polyolefin layer 12a disposed on the metal terminal 2 side is 105° C. or more and 130° C. or less, and the melting peak temperature of the second polyolefin layer 12b disposed on the power storage device packaging material 3 side and the melting peak temperature of the heat-sealable resin layer 35 of the power storage device packaging material 3 are both 130° C. or more, the metal terminal of the power storage device and the heat-sealable resin layer of the power storage device packaging material can adhere to each other until the power storage device is heated to a high temperature (for example, 100 to 130° C., preferably 110 to 130° C., particularly preferably 120 to 130° C.), and the power storage device can open at the position of the adhesive film for a metal terminal to release a gas generated inside the power storage device to the outside when the power storage device is heated to the high temperature (for example, 100 to 130° C., preferably 110 to 130° C., particularly preferably 120 to 130° C.)

While the thickness of the heat-sealable resin layer 35 is not limited, it is about 2 to 2,000 μm, preferably about 5 to 1,000 μm, and more preferably about 10 to 500 μm. The thickness of the heat-sealable resin layer 35 is, for example, about 100 μm or less, preferably about 85 μm or less, and more preferably about 15 to 85 μm. For example, when the thickness of the below-described adhesive layer 5 is 10 μm or more, the thickness of the heat-sealable resin layer 4 is preferably about 85 μm or less, and more preferably about 15 to 45 μm. For example, when the thickness of the below-described adhesive layer 5 is less than 10 μm, or when the adhesive layer 5 is not provided, the thickness of the heat-sealable resin layer 4 is preferably about 20 μm or more, and more preferably about 35 to 85 μm.

2. Power Storage Device

The power storage device 10 of the present disclosure comprises the power storage device element 4 comprising at least a positive electrode, a negative electrode, and an electrolyte, the power storage device packaging material 3 for sealing the power storage device element 4, and the metal terminal 2 electrically connected to each of the positive electrode and the negative electrode and protruding outside the power storage device packaging material 3. In the power storage device 10 of the present disclosure, the adhesive film 1 for a metal terminal of the present disclosure is interposed between the metal terminal 2 and the power storage device packaging material 3. That is, the power storage device 10 of the present disclosure may be produced by a method comprising the step of interposing the adhesive film 1 for a metal terminal of the present disclosure between the metal terminal 2 and the power storage device packaging material 3.

Specifically, the power storage device element 4 including at least a positive electrode, a negative electrode, and an electrolyte is covered with the power storage device packaging material 3 such that, in a state wherein the metal terminal 2 connected to each of the positive electrode and the negative electrode protrudes outside, the adhesive film 1 for a metal terminal of the present disclosure is interposed between the metal terminal 2 and the heat-sealable resin layer 35, and a flange of the power storage device packaging material 3 (region where the heat-sealable resin layer 35 is brought into contact with the other heat-sealable resin layer 35, i.e., the peripheral region 3a of the power storage device packaging material 3) can be formed on the periphery of the power storage device element 4, and then the heat-sealable resin layers 35 in the flange are heat-sealed to hermetically seal the power storage device element. As a result, the power storage device 10 that uses the power storage device packaging material 3 is provided. When the power storage device packaging material 3 is used to house the power storage device element 4, it is used such that the heat-sealable resin layer 35 of the power storage device packaging material 3 is positioned on the inner side (surface in contact with the power storage device element 4) thereof.

Moreover, the power storage device 10 of the present disclosure may be a power storage device comprising a power storage device element comprising at least a positive electrode, a negative electrode, and an electrolyte, a power storage device packaging material for sealing the power storage device element, and a metal terminal electrically connected to each of the positive electrode and the negative electrode and protruding outside the power storage device packaging material, wherein an adhesive film for a metal terminal is interposed between the metal terminal and the power storage device packaging material, the adhesive film for a metal terminal comprises a laminate sequentially including a first polyolefin layer disposed on the metal terminal side, a base material, and a second polyolefin layer disposed on the power storage device packaging material side, and the power storage device opens from a position where the first polyolefin layer or the second polyolefin layer of the adhesive film for a metal terminal is laminated, in an environment at a temperature of 100° C. or more and 130° C. or less. That is, in the power storage device, as long as the power storage device opens from the position where the first polyolefin layer 12a or the second polyolefin layer 12b of the adhesive film 1 for a metal terminal is laminated, the surface hardness of the base material 11 as measured in an environment at a temperature of 110° C. may not necessarily be 15 N/mm² or more, and the melting peak temperature of at least one of the first polyolefin layer 12a and the second polyolefin layer 12b may not necessarily be 105° C. or more and 130° C. or less. As in the adhesive film 1 for a metal terminal of the present disclosure as described above, when the surface hardness of the base material 11 as measured in an environment at a temperature of 110° C. is 15 N/mm² or more, and the melting peak temperature of at least one of the first polyolefin layer 12a and the second polyolefin layer 12b is 105° C. or more and 130° C. or less, the power storage device can be opened favorably from the position where the first polyolefin layer 12a or the second polyolefin layer 12b of the adhesive film 1 for a metal terminal is laminated (particularly the interface region between the first polyolefin layer 12a and the base material 11, or the interface region between the second polyolefin layer 12b and the base material 11), in an environment at a temperature of 100° C. or more and 130° C. or less, preferably 110° C. or more and 130° C. or less, still more preferably 120° C. or more and 130° C. or less.

Furthermore, the power storage device 10 of the present disclosure may be a power storage device comprising the power storage device element comprising at least a positive electrode, a negative electrode, and an electrolyte, a power storage device packaging material for sealing the power storage device element, and the metal terminal electrically connected to each of the positive electrode and the negative electrode and protruding outside the power storage device packaging material, wherein an adhesive film for a metal terminal is interposed between the metal terminal and the power storage device packaging material, the adhesive film for a metal terminal comprises a laminate sequentially including a first polyolefin layer disposed on the metal terminal side, a base material, and a second polyolefin layer disposed on the power storage device packaging material side, the first polyolefin layer has a melting peak temperature of 105° C. or more and 130° C. or less, the second polyolefin layer has a melting peak temperature of 1.30° C. or more, the power storage device packaging material comprises a laminate including at least a base material layer, a barrier layer, and a heat-sealable resin layer, and the heat-sealable resin layer has a melting peak temperature of 130° C. or more. That is, in the power storage device, the melting peak temperature of the first polyolefin layer disposed on the metal terminal side is 105° C. or more and 130° C. or less, and the melting peak temperature of the second polyolefin layer disposed on the power storage device packaging material side and the melting peak temperature of the heat-sealable resin layer of the power storage device packaging material are both 130° C. or more. Because of these features of the power storage device, the metal terminal of the power storage device and the heat-sealable resin layer of the power storage device packaging material can adhere to each other until the power storage device is heated to a high temperature (for example, 100 to 130° C., preferably 110 to 130° C., particularly preferably 120 to 130"C), and the power storage device can open at the position of the adhesive film for a metal terminal to release a gas generated inside the power storage device to the outside when the power storage device is heated to the high temperature (for example, 100 to 130° C., preferably 110 to 130° C., particularly preferably 120 to 130° C.).

The power storage device packaging material of the present disclosure is suitable for use in power storage devices, such as batteries (including condensers and capacitors). The power storage device packaging material of the present disclosure may be used for either primary batteries or secondary batteries, preferably secondary batteries. While the type of secondary batteries to which the power storage device packaging material of the present disclosure is applied is not limited, examples include lithium ion batteries, lithium ion polymer batteries, all-solid-state batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers, and capacitors. Among these secondary batteries, preferred secondary batteries to which the power storage device packaging material of the present disclosure is applied include lithium ion batteries and lithium ion polymer batteries.

EXAMPLES

The present disclosure will be hereinafter described in detail with reference to examples and comparative examples; however, the present disclosure is not limited to the examples.

Example 1

<Production of Adhesive Film for Metal Terminal>

Using the method disclosed in JP-A-H10-502975, polypropylene having a melting peak temperature of 130° C. was synthesized. Next, the polypropylene was reacted with maleic anhydride in the presence of a peroxide to synthesize maleic anhydride-modified polypropylene (PPa) having a melting peak temperature of 123° C., for use as a first polyolefin layer (PPa) to be disposed on the metal terminal side and a second polyolefin layer (PPa) to be disposed on the power storage device packaging material side. As a base material, an unstretched polypropylene film (CPP, homopolypropylene, thickness 40 μm, melting peak temperature 163° C.) was prepared and then subjected to corona treatment (0.2 kW) on both surfaces. Next, using an extruder and a T-die casting machine, the maleic anhydride-modified polypropylene for forming the first polyolefin layer and the acid-modified polypropylene for forming the second polyolefin layer were each extruded at a temperature of 260° C. and a thickness of 20 μm onto one surface and the other surface, respectively, of the unstretched polypropylene film, to produce an adhesive film for a metal terminal in which the first polyolefin layer (PPa layer, thickness 20 μm)/the base material (CPP layer, thickness 40 μm)/the second polyolefin layer (PPa layer, thickness 20 μm) were sequentially laminated.

<Measurement of Surface Hardness of Base Material>

The Martens hardness was adopted as the surface hardness of the base material. The unstretched polypropylene film (CPP) used as the base material was bonded to one side of a glass slide (76 mm×26 mm×1 mm) with a double-faced adhesive tape to provide a measurement sample. Next, a hot stage was mounted on an ultra-microhardness tester (for example, HM2000 from Fischer Instruments) equipped with a Vickers indenter, and the sample was heated by the hot stage set at a stage temperature of 110° C. for 5 minutes. Next, the indenter was pressed into the base material-side surface of the measurement sample to a depth of 1 μm at an indentation rate of 0.1 pulls to measure the surface hardness. Ten measurements were taken, and the average value was adopted. The measured result is shown in Table 1.

<Measurement of Melting Peak Temperature>

The melting peak temperature of the polyolefin produced was measured in accordance with JIS K 7121: 2012 (Testing Methods for Transition Temperatures of Plastics) (Supplement 1 to JIS K 7121: 1987)). The measurement was performed using a differential scanning calorimeter (DSC, the differential scanning calorimeter Q200 from TA Instruments Inc.). The measurement sample was held at −50° C. for 15 minutes and then heated from −50° C. to 210° C. at a heating rate of 10° C./min to measure the first melting peak temperature P (° C.), and thereafter held at 210° C. for 10 minutes. Next, the measurement sample was cooled from 210° C. to −50° C. at a cooling rate of 10° C./min and held for 15 minutes. The measurement sample was further heated from −50° C. to 210° C. at a heating rate of 10° C./min to measure the second melting peak temperature Q (° C.). The flow rate of nitrogen gas was 50 ml/min. Using the above procedure, the first measured melting peak temperature P (° C.) and the second measured melting peak temperature Q (° C.) were obtained, and the first measured melting peak temperature was adopted as the melting peak temperature. The measured result is shown in Table 1.

<Method of Opening Test>

Figure 5:
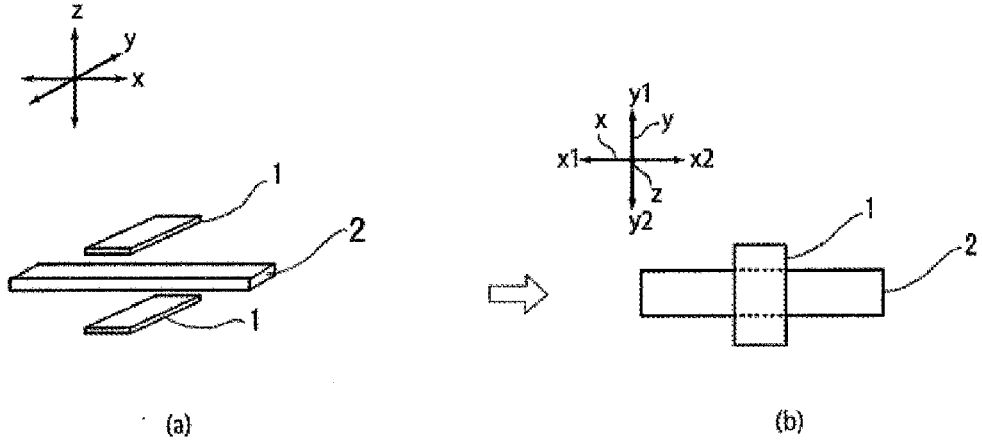
FIG. 5 is a schematic diagram for explaining a method of an opening test in the examples.

An aluminum sheet with a width of 4 mm, a thickness of 70 μm, and a length of 40 mm was used as a metal terminal. The adhesive film for a metal terminal was cut into a size of 1 cm in length and 1 cm in width. Next, as shown in the schematic diagram of FIG. 5, the metal terminal was inserted between the two pieces of the adhesive film for a metal terminal such that the long sides of the metal terminal and the long sides of the adhesive film for a metal terminal were orthogonal to each other, and the pieces of the adhesive film for a metal terminal were heat-sealed to the metal terminal at a pressure of 0.2 MPa. and a temperature of 180° C. for a time of 3 seconds to produce the metal terminal with the adhesive film for a metal terminal attached thereto. Separately, a power storage device packaging material with an entire thickness of 121 μm, composed of a laminate sequentially having a base material layer (PET (thickness 12 μm)/an adhesive (thickness 2 μm)/nylon (thickness 15 μm))/an adhesive agent layer (thickness 2 μm)/a barrier layer (aluminum alloy foil, thickness 40 μm)/an adhesive layer (maleic anhydride-modified polypropylene, thickness 25 μm)/a heat-sealable resin layer (polypropylene, melting peak temperature 150° C., thickness 25 μm), was prepared and then cut into a size of 8 cm×19 cm. Next; two metal terminals with the adhesive film for a metal terminal attached thereto were placed on a short side of the power storage device packaging material at a spacing of 2 cm therebetween, and the long sides of the power storage device packaging material were folded over. Next, the short side of the power storage device packaging material having the metal terminals with the adhesive film for a metal terminal attached thereto was heat-sealed at a pressure of 0.5 MPa, a temperature of 190° C., and a seal width of 3 mm. Then, one long side of the power storage device packaging material was similarly heat-sealed, and 1 g of water was placed in the resulting bag-shaped sample. Thereafter, the open side (long side) of the power storage device packaging material was similarly heat-sealed to give a test sample with water hermetically sealed in. A thermocouple was attached to the metal terminal region of the test sample, and the test sample was placed in an oven and heated from room temperature (25° C.) to 140° C. at a heating rate of 6° C./minute. If the test sample opened at a temperature of 120° C. or more and 130° C. or less, it was evaluated as "A"; if the test sample opened at a temperature of 100° C. or more and less than 120° C., it was evaluated as "B" and if the test sample opened at a temperature above 130° C. and 140° C. or less, or if the test sample did not open even at a temperature above 130° C. and 140° C. or less, it was evaluated as "C". The result is shown in Table 1.

Example 2

The adhesive film for a metal terminal was evaluated as in Example 1, except that maleic anhydride-modified polypropylene having a melting peak temperature of 144° C. was used as the packaging-side second polyolefin layer.

Example 3

The adhesive film for a metal terminal was evaluated as in Example 1, except that polypropylene having a melting peak temperature of 158° C. was used as the packaging-side second polyolefin layer.

Example 4

The adhesive film for a metal terminal was evaluated as in Example 1, except that maleic anhydride-modified polypropylene having a melting peak temperature of 144° C. was used as the metal terminal-side first polyolefin layer, and polypropylene having a melting peak temperature of 120° C. was used as the packaging-side second polyolefin layer.

Example 5

The adhesive film for a metal terminal was evaluated as in Example 1, except that an unstretched polypropylene film (CPP, homopolypropylene, thickness 40 μm, melting peak temperature 138° C.) was used as the base material.

Example 6

The adhesive film for a metal terminal was evaluated as in Example 1, except that maleic anhydride-modified polypropylene having a melting peak temperature of 110° C. was used as the metal terminal-side first polyolefin layer, and polypropylene having a melting peak temperature of 144° C. was used as the packaging-side second polyolefin layer.

Example 7

The adhesive film for a metal terminal was evaluated as in Example 1, except that maleic anhydride-modified polypropylene having a melting peak temperature of 144° C. was used as the metal terminal-side first polyolefin layer, and polypropylene having a melting peak temperature of 110° C. was used as the packaging-side second polyolefin layer.

Example 8

The adhesive film for a metal terminal was evaluated as in Example 1, except that maleic anhydride-modified polypropylene having a melting peak temperature of 105° C. was used as the metal terminal-side first polyolefin layer, and polypropylene having a melting peak temperature of 144° C. was used as the packaging-side second polyolefin layer.

Example 9

The adhesive film for a metal terminal was evaluated as in Example 1, except that maleic anhydride-modified polypropylene having a melting peak temperature of 144° C. was used as the metal terminal-side first polyolefin layer, and polypropylene having a melting peak temperature of 105° C. was used as the packaging-side second polyolefin layer.

Comparative Example 1

The adhesive film for a metal terminal was evaluated as in Example 1, except that maleic anhydride-modified polypropylene having a melting peak temperature of 144° C. was used as the metal terminal-side first polyolefin layer and the packaging-side second polyolefin layer.

Comparative Example 2

The adhesive film for a metal terminal was evaluated as in Example 1, except that maleic anhydride-modified polypropylene having a melting peak temperature of 144° C. was used as the metal terminal-side first polyolefin layer, and polypropylene having a melting peak temperature of 158° C. was used as the packaging-side second polyolefin layer.

Comparative Example 3

The adhesive film for a metal terminal was evaluated as in Example 1, except that an unstretched polypropylene film (CPP, random polypropylene, thickness 40 μm, melting peak temperature 133° C.) was used as the base material.

Comparative Example 4

The adhesive film for a metal terminal was evaluated as in Example 1, except that an unstretched polypropylene film (CPP, random polypropylene, thickness 40 μm; melting peak temperature 143° C.) was used as the base material.

TABLE 1

| | Melting Peak Temperature (° C.) | | | | |
| | Metal Terminal-Side First Polyolefin | Base Material | Packaging-Side Second Polyolefin | Evaluation of Opening Temperature | Surface Hardness (N/mm$^2$) at 110° C. of Base Material |
| --- | --- | --- | --- | --- | --- |
| Example 1 | 123° C. PPa | 163° C. Homopolymer | 123° C. PPa | A | 39 |
| Example 2 | 123° C. PPa | 163° C. Homopolymer | 144° C. PPa | A | 39 |
| Example 3 | 123° C. PPa | 163° C. Homopolymer | 158° C. PP | A | 39 |
| Example 4 | 144° C. PPa | 163° C. Homopolymer | 120° C. PP | A | 39 |
| Example 5 | 123° C. PPa | 138° C. Homopolymer | 123° C. PPa | A | 16 |
| Example 6 | 110° C. PPa | 163° C. Homopolymer | 144° C. PP | A | 39 |
| Example 7 | 144° C. PPa | 163° C. Homopolymer | 110° C. PP | A | 39 |
| Example 8 | 105° C. PPa | 163° C. Homopolymer | 144° C. PP | A | 39 |
| Example 9 | 144° C. PPa | 163° C. Homopolymer | 105° C. PP | A | 39 |
| Comparative Example 1 | 144° C. PPa | 163° C. Homopolymer | 144° C. PPa | C | 39 |
| Comparative Example 2 | 144° C. PPa | 163° C. Homopolymer | 158° C. PP | C | 39 |
| Comparative Example 3 | 123° C. PPa | 133° C. Random Copolymer | 123° C. PPa | C | 12 |
| Comparative Example 4 | 123° C. PPa | 143° C. Random Copolymer | 123° C. PPa | C | 13 |

As described above, the present disclosure provides embodiments of the invention as set forth below:

Item 1. An adhesive film for a metal terminal, which is to be interposed between a metal terminal electrically connected to an electrode of a power storage device element and a power storage device packaging material for sealing the power storage device element, wherein the adhesive film for a metal terminal comprises a laminate sequentially including a first polyolefin layer disposed on the metal terminal side, a base material, and a second polyolefin layer disposed on the power storage device packaging material side, at least one of the first polyolefin layer and the second polyolefin layer has a melting peak temperature of 105° C. or more and 130° C. or less, and the base material has a surface hardness of 15 N/mm$^2$ or more, as measured in an environment at a temperature of 110° C.

Item 2. The adhesive film for a metal terminal according to item 1, wherein at least one of the first polyolefin layer and the second polyolefin layer contains an acid-modified polyolefin.

Item 3. The adhesive film for a metal terminal according to item 1 or 2, wherein the base material contains a polyolefin backbone.

Item 4. The adhesive film for a metal terminal according to any one of items 1 to 3, wherein the first polyolefin layer and the base material are in surface contact with each other, and the second polyolefin layer and the base material are in surface contact with each other.

Item 5. A method for producing an adhesive film for a metal terminal, which is to be interposed between a metal terminal electrically connected to an electrode of a power storage device element and a power storage device packaging material for sealing the power storage device element, wherein the adhesive film for a metal terminal comprises a laminate sequentially including a first polyolefin layer disposed on the metal terminal side, a base material, and a second polyolefin layer disposed on the power storage device packaging material side, the method comprising the step of obtaining the laminate sequentially including the first polyolefin layer, the base material, and the second polyolefin layer, wherein at least one of the first polyolefin layer and the second polyolefin layer has a melting peak temperature of 105° C. or more and 130° C. or less, and the base material has a surface hardness of 15 N/mm$^2$ or more, as measured in an environment at a temperature of 110° C.

Item 6. A metal terminal with an adhesive film for a metal terminal attached thereto, comprising the adhesive film for a metal terminal according to any one of items 1 to 4, wherein the adhesive film for a metal terminal is attached to the metal terminal.

Item 7. A power storage device comprising the power storage device element comprising at least a positive electrode, a negative electrode, and an electrolyte, the power storage device packaging material for sealing the power storage device element, and the metal terminal electrically connected to each of the positive electrode and the negative electrode and protruding outside the power storage device packaging material, wherein the adhesive film for a metal terminal according to any one of items 1 to 4 is interposed between the metal terminal and the power storage device packaging material.

Item 8. A power storage device comprising the power storage device element comprising at least a positive electrode, a negative electrode, and an electrolyte, the power storage device packaging material for sealing the power storage device element, and the metal terminal electrically connected to each of the positive electrode and the negative electrode and protruding outside the power storage device packaging material, wherein an adhesive film for a metal terminal is interposed between the metal terminal and the power storage device packaging material, the adhesive film for a metal terminal comprises a laminate sequentially including a first polyolefin layer disposed on the metal terminal side, a base material, and a second polyolefin layer disposed on the power storage device packaging material side, and the power storage device opens from a position where the first polyolefin layer or the second polyolefin layer of the adhesive film for a metal terminal is laminated, in an environment at a temperature of 100° C. or more and 130° C. or less.

Item 9. A power storage device comprising the power storage device element comprising at least a positive electrode, a negative electrode, and an electrolyte, a power storage device packaging material for sealing the power storage device element, and the metal terminal electrically connected to each of the positive electrode and the negative electrode and protruding outside the power storage device packaging material, wherein an adhesive film for a metal terminal is interposed between the metal terminal and the power storage device packaging material, the adhesive film for a metal terminal comprises a laminate sequentially including a first polyolefin layer disposed on the metal terminal side, a base material, and a second polyolefin layer disposed on the power storage device packaging material side, the first polyolefin layer has a melting peak temperature of 105° C. or more and 130° C. or less, the second polyolefin layer has a melting peak temperature of 130° C. or more, the power storage device packaging material comprises a laminate including at least a base material layer, a barrier layer, and a heat-sealable resin layer, and the heat-sealable resin layer has a melting peak temperature of 130° C. or more.

Item 10. A power storage device packaging material for use in a power storage device, wherein the power storage device comprises a power storage device element comprising at least a positive electrode, a negative electrode, and an electrolyte, the power storage device packaging material for sealing the power storage device element, and the metal terminal electrically connected to each of the positive electrode and the negative electrode and protruding outside the power storage device packaging material, and wherein an adhesive film for a metal terminal is interposed between the metal terminal and the power storage device packaging material, and the adhesive film for a metal terminal comprises a laminate sequentially including a first polyolefin layer disposed on the metal terminal side, a base material, and a second polyolefin layer disposed on the power storage device packaging material side, and the adhesive film for a metal terminal has a function of opening from a position where the first polyolefin layer or the second polyolefin layer of the adhesive film for a metal terminal is laminated, in an environment at a temperature of 100° C. or more and 130° C., or less, the power storage device packaging material comprising a laminate including at least a base material layer, a barrier layer, and a heat-sealable resin layer, wherein the heat-sealable resin layer has a melting peak temperature that is 130° C. or more and higher than a melting peak temperature of the first polyolefin layer of the adhesive film for a metal terminal.

Item 11. A method for producing a power storage device comprising the power storage device element comprising at least a positive electrode, a negative electrode, and an electrolyte, the power storage device packaging material for sealing the power storage device element, and the metal terminal electrically connected to each of the positive electrode and the negative electrode and protruding outside the power storage device packaging material, the method comprising the step of interposing the adhesive film for a metal terminal according to any one of items 1 to 4 between the metal terminal and the power storage device packaging material, and sealing the power storage device element with the power storage device packaging material.

REFERENCE SIGNS LIST

1: adhesive film for a metal terminal
2: metal terminal
3: power storage device packaging material
3a: peripheral region of power storage device packaging material
4: power storage device element
10: power storage device
11: base material
12a: first polyolefin layer
12b: second polyolefin layer
31: base material layer
32: adhesive agent layer
33: barrier layer
34: adhesive layer
35: heat-sealable resin layer

The invention claimed is:

1. An adhesive film for a metal terminal, which is to be interposed between a metal terminal electrically connected to an electrode of a power storage device element and a power storage device packaging material for sealing the power storage device element, wherein the adhesive film for a metal terminal comprises a laminate sequentially including a first polyolefin layer disposed on the metal terminal side, a base material, and a second polyolefin layer disposed on the power storage device packaging material side, at least one of the first polyolefin layer and the second polyolefin layer has a melting peak temperature of 105° C. or more and 130° C. or less, and the base material has a surface hardness of 15 N/mm$^2$ or more, as measured in an environment at a temperature of 110° C.

2. The adhesive film for a metal terminal according to claim 1, wherein at least one of the first polyolefin layer and the second polyolefin layer contains an acid-modified polyolefin.

3. The adhesive film for a metal terminal according to claim 1, wherein the base material contains a polyolefin backbone.

4. The adhesive film for a metal terminal according to claim 1, wherein the first polyolefin layer and the base material are in surface contact with each other, and the second polyolefin layer and the base material are in surface contact with each other.

5. The adhesive film for a metal terminal according to claim 1, wherein the base material layer has a melting point of at least 163° C.

6. The adhesive film for a metal terminal according to claim 1, wherein the base material has a surface hardness of 30 N/mm² or more, as measured in an environment at a temperature of 110° C.

7. A metal terminal with an adhesive film for a metal terminal attached thereto, comprising the adhesive film for a metal terminal according to claim 1, wherein the adhesive film for a metal terminal is attached to the metal terminal.

8. A power storage device comprising a power storage device element comprising at least a positive electrode, a negative electrode, and an electrolyte, a power storage device packaging material for sealing the power storage device element, and the metal terminal electrically connected to each of the positive electrode and the negative electrode and protruding outside the power storage device packaging material, wherein the adhesive film for a metal terminal according to claim 1 is interposed between the metal terminal and the power storage device packaging material.

9. A method for producing a power storage device comprising a power storage device element comprising at least a positive electrode, a negative electrode, and an electrolyte, the power storage device packaging material for sealing the power storage device element, and the metal terminal electrically connected to each of the positive electrode and the negative electrode and protruding outside the power storage device packaging material, the method comprising the step of interposing the adhesive film for a metal terminal according to claim 1 between the metal terminal and the power storage device packaging material, and sealing the power storage device element with the power storage device packaging material.

10. A method for producing an adhesive film for a metal terminal, which is to be interposed between a metal terminal electrically connected to an electrode of a power storage device element and a power storage device packaging material for sealing the power storage device element, wherein the adhesive film for a metal terminal comprises a laminate sequentially including a first polyolefin layer disposed on the metal terminal side, a base material, and a second polyolefin layer disposed on the power storage device packaging material side, the method comprising the step of obtaining the laminate sequentially including the first polyolefin layer, the base material, and the second polyolefin layer, wherein at least one of the first polyolefin layer and the second polyolefin layer has a melting peak temperature of 105° C. or more and 130° C. or less, and the base material has a surface hardness of 15 N/mm² or more, as measured in an environment at a temperature of 110° C.

* * * * *